(No Model.)
J. MOREHEAD.
STEAM TRAP.
No. 327,892. Patented Oct. 6, 1885.
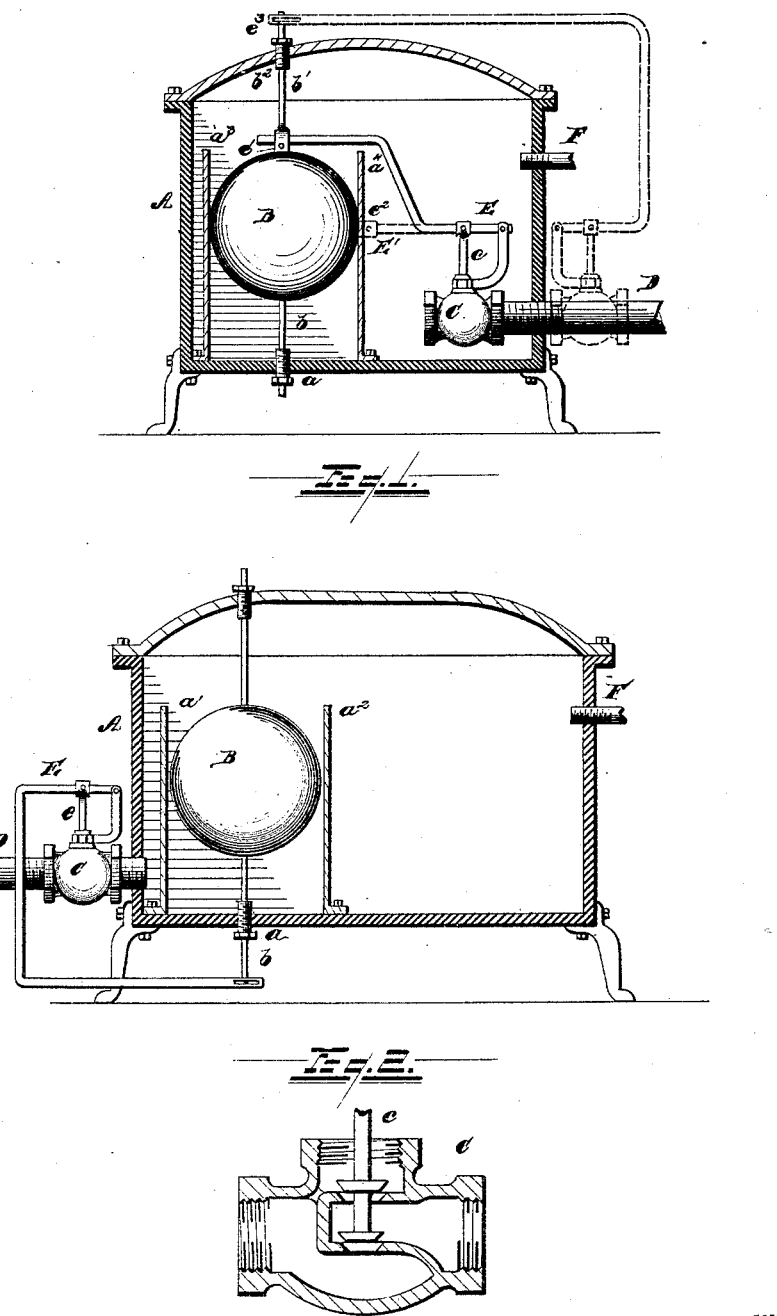

UNITED STATES PATENT OFFICE.

JOHN MOREHEAD, OF DETROIT, MICHIGAN.

STEAM-TRAP.

SPECIFICATION forming part of Letters Patent No. 327,892, dated October 6, 1885.

Application filed March 24, 1885. Serial No. 159,950. (No model.)

*To all whom it may concern:*

Be it known that I, JOHN MOREHEAD, of Detroit, county of Wayne, State of Michigan, have invented a new and useful Improvement in Steam-Traps; and I declare the following to be a full, clear, and exact description of the same, such as will enable others skilled in the art to which it pertains to make and use it, reference being had to the accompanying drawings, which form a part of this specification.

My invention relates to steam-traps, and is designed to relieve steam-pipes of the water of condensation accumulated therein.

The object of my invention is to provide such a trap, which shall be simple and economical in its construction.

In the drawings which form part of this specification, Figure 1 is a cross-section of a device embodying my invention. Fig. 2 is a longitudinal section showing a modification of my invention; Fig. 3, a separate view.

I carry out my invention as follows:

A represents any suitable chamber to receive the condensed water.

B is a float provided with a tubular stem, $b$, communicating with the interior of the float and adapted to relieve it of any water that may enter into the float. The stem passes through the stuffing-box $a$ to the exterior of the chamber.

C represents a valve, of any desired construction, communicating with a waste or outflow pipe, D, opening into said chamber. The valve may be located within the chamber, as shown in Fig. 1, or it may be located on the outside of the chamber, as shown in dotted lines, Fig. 1, and also in Fig. 2.

E is a lever, connected with a valve-stem, $c$, and operated by the float, the construction being such that when the float rises, as the water accumulates in the chamber and reaches any desired point, it will lift the lever and open the valve, and vice versa, when the float descends, after the chamber has been relieved of the water, the lever will fall and close the valve.

It is evident that the lever may be connected with and operated by the float in different ways—as, for instance, as shown in full lines, Fig. 1.

The lever may be engaged with the float at the top, as indicated at $e'$, by an intervening-arm, $e'$, or otherwise; or the lever may be extended within the chamber, as shown in dotted lines at E', and engaged with an arm, $e^2$, upon the side of the float; or, if it is desired to locate the valve on the outside of the chamber, as shown in dotted lines, Fig. 1, the float may be provided with an upwardly-extended stem, $b'$, passed through the cover of the chamber and engaged with the lever upon the outside, as shown at $e^3$; or, again, the lever may be operated by the hollow stem $b$, projected from beneath the float, as shown in Fig. 2.

I would have it understood that I do not limit myself to the engagement of the lever with the float in any particular manner.

The outlet-pipe may be connected with the chamber in any desired position, and the valve located therein, within or without the chamber.

It may be desirable to provide the chamber with guides $a'$ $a^2$ $a^3$ $a^4$, to control the reciprocation of the float, although it is obvious that these guides may be dispensed with, especially when the float is provided with an upwardly-extended stem, $b'$, as well as the hollow stem $b$, as these stems will form a sufficient guide for the float.

The operation of the device will be readily understood.

I should generally prefer to locate the valve within the chamber, as shown in full lines in Fig. 1, as this dispenses with the necessity of packing the valve-stem.

The upwardly-extended arm may be provided with a stuffing-box at $b^2$, or the stuffing-box may be dispensed with. At the point of the engagement of the lever of the float I prefer to locate rollers to carry the lever, to avoid friction.

F represents the inlet-pipe. I prefer to use a double seated equalizing-valve, as such a valve will be more easily operated by the float.

What I claim is—

1. The combination, with a chamber, of a discharge-pipe having a valve located therein provided with an operating-lever, and a float engaged with said lever, said float provided with a vertical hollow stem, $b$, and vertical stem $b'$, affording an outlet to the float, and serving to guide it so as to rise and fall perpendicularly, said stems extended to the exterior of the chamber, whereby the float may be engaged with said lever, either upon the inside or outside of said chamber, substantially as described.

2. The combination, with a chamber, of a discharge-pipe having a valve located therein provided with an operating-lever, and a float engaged with said lever, said float arranged to rise and fall perpendicularly, and provided with a vertical hollow stem, $b$, extended through a stuffing-box, $a$, to the exterior of the case, substantially as described.

3. In a steam-trap, the combination of the chamber A, having a discharge-pipe, D, provided with a valve, C, and a lever connected with the valve, a float rising and falling in a straight vertical line in the chamber, and a hollow stem extending from the float and projecting through and beyond the wall of the chamber, substantially as described, to permit the lever of the valve to be connected with the float, either inside or outside the chamber, as set forth.

In testimony whereof I sign this specification in the presence of two witnesses.

JOHN MOREHEAD.

Witnesses:
N. S. WRIGHT,
M. B. O'DOGHERTY.